Dec. 3, 1957  W. E. CHILDRESS  2,814,871
TREE TRIMMING SAW
Filed June 21, 1957  2 Sheets-Sheet 1
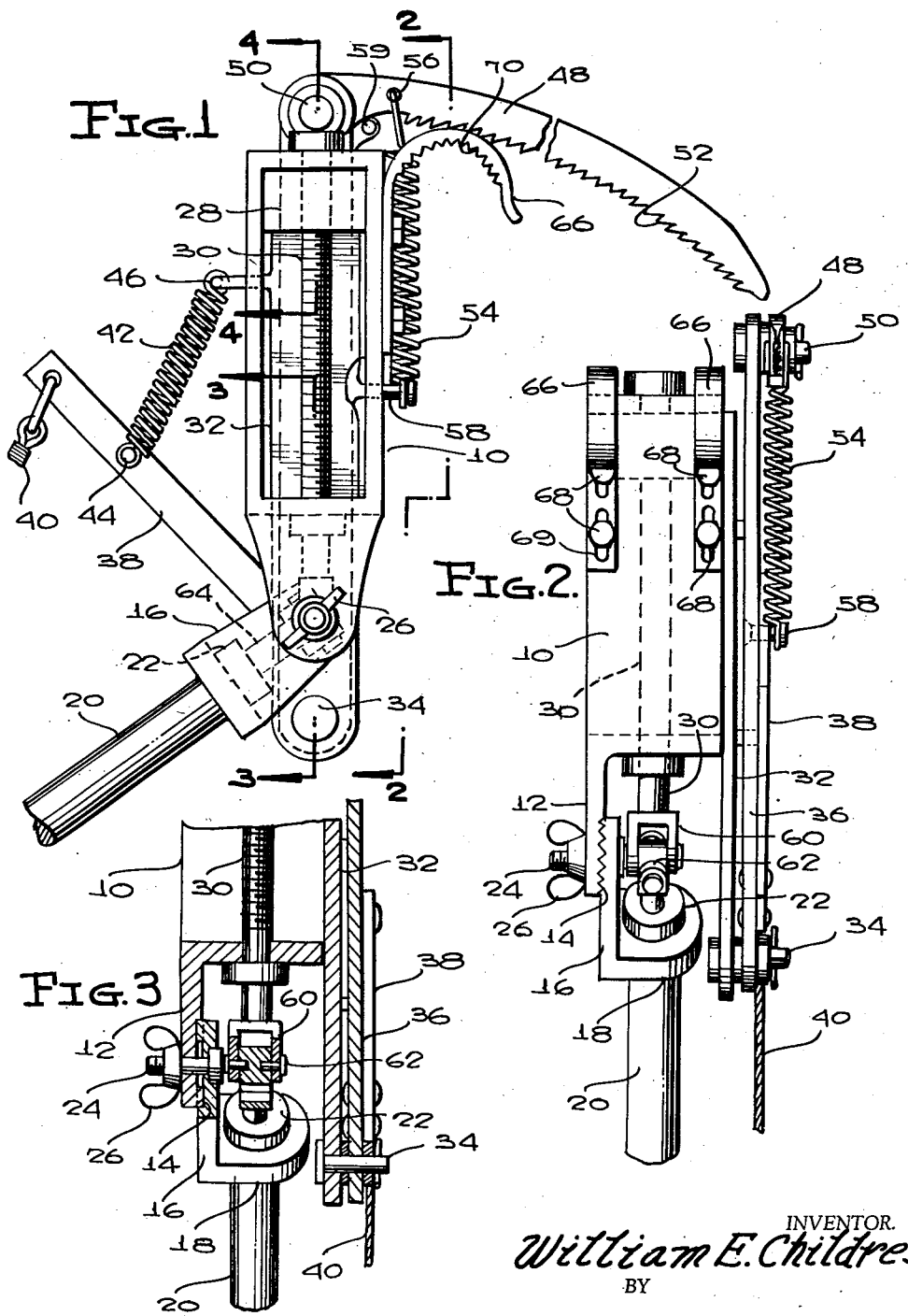
INVENTOR.
William E. Childress,
BY
McMorrow, Berman & Davidson
ATTORNEYS Dec. 3, 1957     W. E. CHILDRESS     2,814,871
TREE TRIMMING SAW
Filed June 21, 1957     2 Sheets-Sheet 2
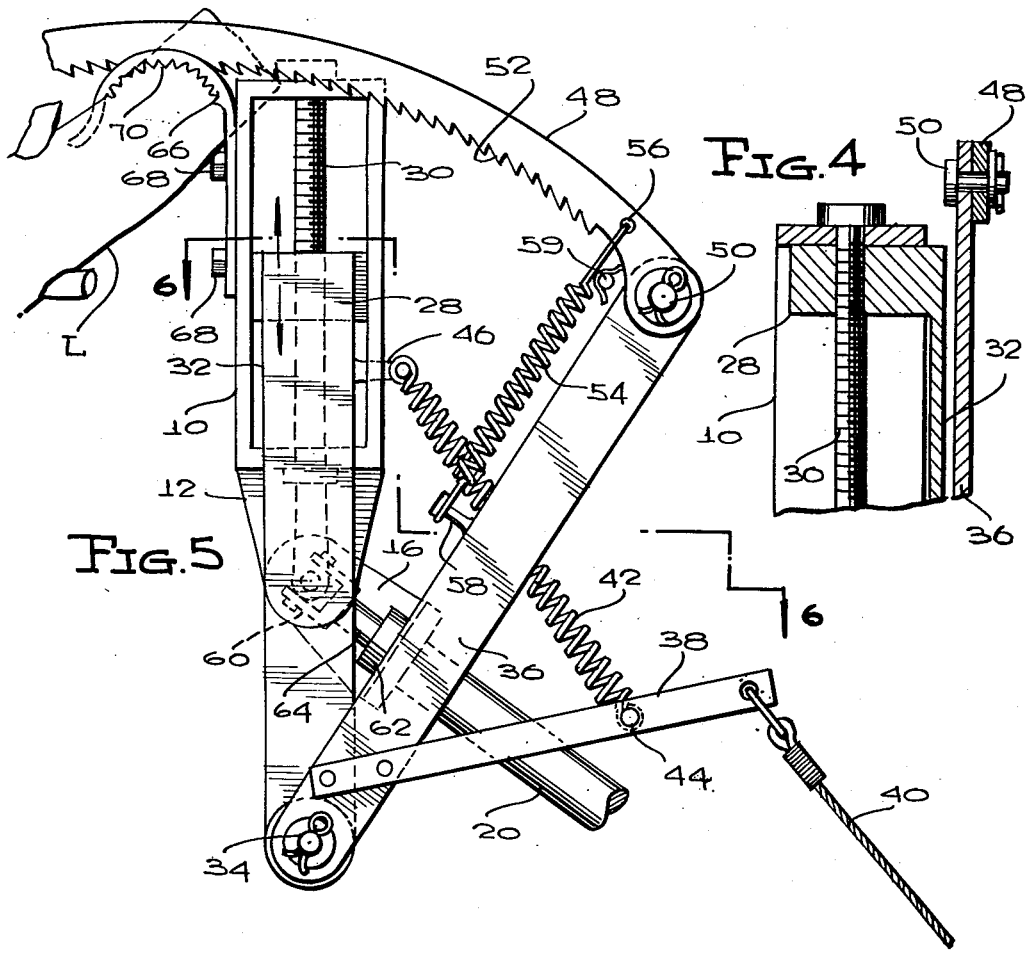
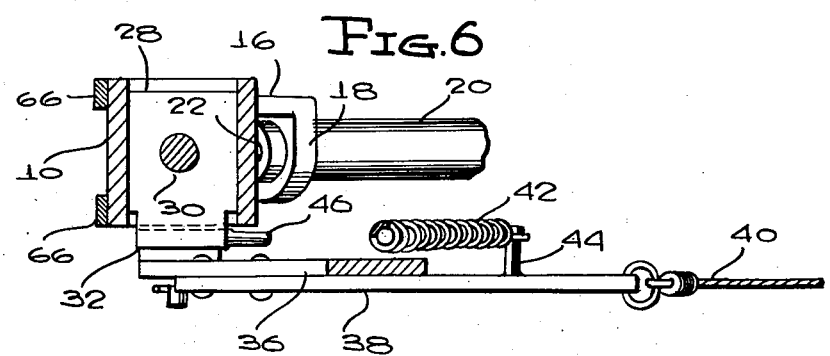
INVENTOR.
William E. Childress,
BY
McMorrow, Berman & Davidson
ATTORNEYS

United States Patent Office 2,814,871
Patented Dec. 3, 1957

2,814,871

TREE TRIMMING SAW

William E. Childress, Marietta, Ga.

Application June 21, 1957, Serial No. 667,221

7 Claims. (Cl. 30—166)

This invention relates generally to saws, and more particularly has reference to a hand saw designed to particularly facilitate the sawing of tree limbs, from locations remotely disposed in respect to said limbs.

Continuing difficulty exists in the sawing of tree limbs, in that it is a troublesome and inefficient operation to saw the limb when one is located a substantial distance therefrom. For example, it is desirable, many times, to saw off a tree limb, without the necessity of climbing the tree, and sawing the limb while one remains on the ground tends in many instances to prove an unsatisfactory way of handling the situation.

This is due to the fact that it is exceedingly difficult to hold the saw firmly against the limb, during the reciprocating motion of the saw, when one has to manipulate the saw through the medium of an elongated pole. It is difficult to apply sufficient pressure tending to hold the saw in the kerf, and also, control of the length of the stroke of the saw is also rather difficult.

One important object of the present invention is to obviate the difficulties which have heretofore persisted. In this connection, in accordance with the invention means supporting a saw blade for oscillating movement is adapted to be suspended directly from the tree limb that is being cut, so that the saw blade will be designed to cut through the limb without danger of the blade accidentally moving out of the kerf formed thereby in the limb.

Further in accordance with the invention, the saw blade is not only mounted to swing in the direction of its length through an arcuate path, but also, is spring-biased radially inwardly of the limb, so that it will at all times be pressed firmly into the bottom of the cut made in the limb.

Another object of importance is to provide means for effecting the adjustment, from a remote location, of the tension with which the saw blade is urged radially inwardly of the limb.

Still another object of importance is to provide means for effecting adjustments, simultaneously with the adjustment of the tension exerted on the saw blade, such that the extent of force required for pulling the saw blade support arm rearwardly may be varied according to the needs of the particular situation.

Other objects will appear from the following description, the claims appended thereto, and from the annexed drawing in which like reference characters designate like parts throughout the several views and wherein:

Figure 1 is a side elevational view of a tree limb sawing device according to the present invention, portions being broken away;

Figure 2 is a view substantially on line 2—2 of Figure 1;

Figure 3 is an enlarged, fragmentary sectional view longitudinally through the device, substantially on line 3—3 of Figure 1;

Figure 4 is a view on the same scale as Figure 3, through the upper end portion of the device, substantially on line 4—4 of Figure 1;

Figure 5 is a side elevational view on the same scale as Figure 1, showing the side opposite that seen in Figure 1; and Figure 6 is a sectional view substantially on line 6—6 of Figure 5.

Referring to the drawing in detail, the invention includes an elongated, rectangular housing 10, said housing having parallel sides, and being wholly open, between said sides, over the full length of the housing, as shown to particular advantage in Figure 5. The housing 10, at one end, is integral (Figure 2) with a depending bracket 12, disposed in the plane of one of the open sides of the housing and formed, at its lower end, with a circular series of teeth 14, adapted to mesh with a complementary series of teeth provided upon the upper end of an L-shaped bracket 16 having a laterally inwardly extending, wide arm 18 (Figure 3) centrally apertured to receive the upper end of an elongated pole or handle 20 rigid with a collar or head 22 that is engaged against the upper surface of the arm 18.

Bracket 16 is connected to the depending extension 12 of the housing for swingable adjustment about an axis extending transversely of the housing and intersecting with the longitudinal median of the housing. To effect the connection of the bracket to the depending extension, there is provided a pin or bolt 24, on which is threaded a wing nut 26 bearing against extension 12.

Thus, the housing can be fixedly connected to the upper end of the pole 20, in selected positions of pivotal adjustment of the housing about an axis extending transversely of the length of the pole. In each position to which the housing is so adjusted, it is lockable in said position by turning of the wing nut 26 home against the extension 12 to cause the teeth of the bracket 16 and extension 12 to interengage.

Most usually, the housing would be adjusted to a position in which it will extend vertically with the pole 20 inclined at an angle convenient to the user, so that the user might stand on the ground and manipulate the pole to locate the housing in the manner shown in Figures 1 and 5 in respect to a tree limb designated at L in Figure 5. The housing in this position is at an obtuse angle to the length of the pole 20.

Longitudinally slidable within the housing, and held against rotation by the opposite side walls of the housing, is a follower block or nut 28, having a threaded center opening in which is engaged (Figure 4) an elongated screw 30, the opposite ends of which are rotatably engaged in the respective end walls of the housing, said ends of the screw being formed with heads to hold the screw against endwise movement during its rotation in the housing. The screw is extended longitudinally and centrally of the housing, and obviously, on rotation of the screw, a follower block 28 will be shifted longitudinally of the housing in a selected direction.

Integral with the follower 28, at one side thereof, is an elongated, depending arm 32 which lies in a plane parallel to the length of the screw 30 and which extends in slidable contact with one of the open sides of the housing, said arm projecting well below the lower end of the extension as clearly shown in Figures 1, 2 and 5. The elongated arm 32, at its lower end, carries a laterally outwardly projecting pin 34 that extends through an opening formed in the lower end of an elongated saw blade support arm 36, the arm 36 thus pivoting at its lower end upon the lower end of the arm or support plate 32 about an axis extending transversely of the housing and defined by the pin 34, said axis being normal to the axis of rotation of the screw 30 and being parallel to the axis of pivotal adjustment of the bracket 16 upon the housing, the last-named axis being defined by the pin or bolt 24.

Riveted or otherwise fixedly secured to the lower end portion of the arm 36, so as to swing therewith, is an actuating arm 38, extending at an acute angle to the length of the arm 36 and attached, at its outer end, to a cable 40 that extends to the ground and is adapted to be manipulated by the user.

A contractile coil spring 42 is connected at 44, at one end, to the intermediate portion of the arm 38. At its other end, spring 42 is attached to a laterally projecting finger 46 integral with the support plate 32.

An elongated, arcuate raw blade 48 is pivotally connected by a pin 50, at its inner end, to the upper end of the arm 36, for swinging movement about an axis parallel to the axes defined by the pin 34, 24. Blade 48 is thus swingable in the direction of its length about the axis 34, with arm 36. Blade 48, further, is swingable about the axis defined by the pin 50, upon the arm 36.

Blade 48 is provided with a series of teeth 52 on its inner longitudinal edge, and said teeth are adapted to cut through the limb L during the oscillating movement of the blade 48 about the axis 34 with arm 36.

A contractile spring 54 is connected at one end as at 56 to the inner end portion of the blade 48, and extends along the arm 36, being connected at its other end to a laterally projecting finger 58 formed upon the midlength portion of the arm 36. The spring 54, tending to contract, shifts the blade resiliently, yieldably in a counterclockwise direction viewing the same as in Figure 5, about the pivot axis defined by the pin 50. As a result, the blade tends to move radially inwardly of the limb, while at the same time being shifted in the direction of its length through an arcuate path that follows the longitudinal curvature of the blade. A stop 59 is formed upon the upper end portion of the arm 36, limiting the swinging movement of the blade 48 about the axis defined by pin 50, under the pull of the spring 54.

Means is provided for suspending the device from the tree limb that is being cut. To this end, identical, laterally spaced, downwardly opening hooks 66 are fixedly secured by bolts 68, to one side wall of housing 10. The inner legs of the hooks have slots 69 receiving the bolt, to permit adjustment of the hooks longitudinally of the housing. The hooks can be removed, for replacement by other hooks, and in a commercial embodiment, a plurality of interchangeable hooks having different sizes may be used, to accommodate the device to any size of limb L. The inner surfaces of the curved legs of the hooks are provided with teeth 70 as shown in Figures 1 and 5, to assure a good grip of the hooks upon the tree limb.

Means is provided for rotating the screw 30 from a location remote from the device. To this end, the lower end portion of the screw projects below the lower end wall of housing 10, and is connected by a universal joint 60, 62 to a reduced axial extension 64 of pole 20. The pole is rotatable in the opening provided therefor in the leg 18 of bracket 16. As a result, one can from the ground rotate the pole 20, so as to turn the screw 30 and this will adjust the follower 28 upwardly or downwardly. This will in turn effect a corresponding, bodily adjustment of the support plate 32, the arm 36, the spring 54, the spring 42, arm 38, and blade 48. The purpose of this is to locate the teeth of the blade 48 a selected distance upwardly from the curved portions of the hooks 66, to begin the cutting of the tree limb. Subsequently, as the cutting proceeds, successive adjustments can be made by rotation of pole 20, to progressively lower the saw blade 48 in respect to the limb-straddling hooks 66.

In use of the device, one effects the desired initial adjustment of the position of the blade 48, by rotation of the pole 20 in the manner previously described. Then, with the hooks 66 engaged over the limbs to be cut, one merely pulls upon the cable 40, to swing the arm 36 outwardly from the housing, upon the pin 34, said arms swinging from the Figure 1 to the Figure 5 position thereof. This is against the restraint of the spring 42, and the spring 42 serves to swing the arm 36 back to its initial position. As a result, the blade 48 is shifted back and forth, to cut through the tree limb, and as it moves back and forth in this manner, said blade is at the same time swinging counterclockwise in Figure 5 about the axis defined by the pin 50, under the pull of the spring 54, so as to cause the blade to exert a continuous pressure against the limb, holding the blade in the base of the kerf or cut. Successive adjustments can be made in the blade position, by progressive lowering of the block 28, if necessary.

The invention is adapted to permit the swift and accurate cutting of tree limbs, by one standing upon the ground or located in some other way remotely from the limb that is being cut.

It is believed apparent that the invention is not necessarily confined to the specific use or uses thereof described above since it may be utilized for any purpose to which it may be suited. Nor is the invention to be necessarily limited to the specific construction illustrated and described, since such construction is only intended to be illustrative of the principles it being considered that the invention comprehends any minor change in construction that may be permitted within the scope of the appended claims.

What is claimed is:

1. A tree limb sawing device comprising an elongated housing; means for suspending said housing from a tree limb to be sawed; a screw rotatable in the housing; a follower threadedly engaged with the screw and slidable in the housing so as to shift longitudinally of the housing responsive to rotation of the screw; an elongated pole having a connection to the housing such that the pole may be rotated relative to the housing, the pole having a universal connection to the screw for rotating the screw responsive to rotation of the pole; an arm pivotally connected to the follower; a saw blade carried by said arm and projecting forwardly from the arm for sawing through said tree limb responsive to swinging of the arm in opposite directions; a pull cord having a connection to the arm for swinging the same in one direction; and a contractile spring having a connection between the follower and said arm for resiliently, yieldably biasing the arm in an opposite direction.

2. A tree limb sawing device comprising an elongated housing; means for suspending said housing from a tree limb to be sawed; a screw rotatable in the housing; a follower threadedly engaged with the screw and slidable in the housing so as to shift longitudinally of the housing responsive to rotation of the screw; an elongated pole having a connection to the housing such that the pole may be rotated relative to the housing, the pole having a universal connection to the screw for rotating the screw responsive to rotation of the pole; an arm pivotally connected to the follower; a saw blade carried by said arm and projecting forwardly from the arm for sawing through said tree limb responsive to swinging of the arm in opposite directions; a pull cord having a connection to the arm for swinging the same in one direction; and a contractile spring having a connection between the follower and said arm for resiliently, yieldably biasing the arm in an opposite direction, said saw blade being pivotally carried by the arm and being resiliently, yieldably biased about its pivotal connection to the arm about an axis paralleling the axis of the arm, in a direction tending to shift the saw blade radially inwardly of a limb being cut thereby.

3. A tree limb cutting device comprising an elongated housing; hook means carried by the housing for suspending the same from a limb to be cut; a screw rotatable in and extending longitudinally of the housing; a follower threadedly engaged with the screw and held against rotation by the housing, for shifting of the follower longitudinally of the housing responsive to rotation of the screw; a support plate rigid with the follower for movement therewith longitudinally of the housing; an elongated arm pivotally carried by the support plate, said arm swinging in a plane adjacent one side of the housing; a saw blade projecting forwardly from and swingable with the arm, for cutting through said limb responsive to swinging of the arm in opposite directions, adjustment of said follower longitudinally of the housing being adapted for shifting the blade longitudinally of the housing to selected positions relative to said hooks; means adapted to be controlled remotely from the housing for swinging the arm; and means connected to the screw extending downwardly from the housing for rotating the screw from a location remote from the housing.

4. A tree limb cutting device comprising an elongated housing; hook means carried by the housing for suspending the same from a limb to be cut; a screw rotatable in and extending longitudinally of the housing; a follower threadedly engaged with the screw and held against rotation by the housing, for shifting of the follower longitudinally of the housing responsive to rotation of the screw; a support plate rigid with the follower for movement therewith longitudinally of the housing; an elongated arm pivotally carried by the support plate, said arm swinging in a plane adjacent one side of the housing; a saw blade projecting forwardly from and swingable with the arm, for cutting through said limb responsive to swinging of the arm in opposite directions, adjustment of said follower longitudinally of the housing being adapted for shifting the blade longitudinally of the housing to selected positions relative to said hooks; means adapted to be controlled remotely from the housing for swinging the arm; and means connected to the screw extending downwardly from the housing for rotating the screw from a location remote from the housing, comprising an elongated pole and a bracket connected to the housing for adjustment to selected angular positions relative to the housing, said pole being journaled in the bracket for adjustment therewith in respect to the housing, said pole having a universal connection to the screw for rotating the screw in each position to which the pole is angularly adjusted in respect to the housing.

5. A tree limb cutting device comprising an elongated housing; hook means carried by the housing for suspending the same from a limb to be cut; a screw rotatable in and extending longitudinally of the housing; a follower threadedly engaged with the screw and held against rotation by the housing, for shifting of the follower longitudinally of the housing responsive to rotation of the screw; a support plate rigid with the follower for movement therewith longitudinally of the housing; an elongated arm pivotally carried by the support plate, said arm swinging in a plane adjacent one side of the housing; a saw blade projecting forwardly from and swingable with the arm for cutting through said limb responsive to swinging of the arm in opposite directions, adjustment of said follower longitudinally of the housing being adapted for shifting the blade longitudinally of the housing to selected positions relative to said hooks, means adapted to be controlled remotely from the housing for swinging the arm; and means connected to the screw extending downwardly from the housing for rotating the screw from a location remote from the housing, comprising an elongated pole and a bracket connected to the housing for adjustment to selected angular positions relative to the housing, said pole being journaled in the bracket for adjustment therewith in respect to the housing, said pole having a universal connection to the screw for rotating the screw in each position to which the pole is angularly adjusted in respect to the housing, said bracket and housing having interlocking means engaging in each position to which the bracket is adjusted, for maintaining the bracket in the selected position of adjustment.

6. A tree limb cutting device comprising an elongated housing; hook means carried by the housing for suspending the same from a limb to be cut; a screw rotatable in and extending longitudinally of the housing; a follower threadedly engaged with the screw and held against rotation by the housing, for shifting of the follower longitudinally of the housing responsive to rotation of the screw; a support plate rigid with the follower for movement therewith longitudinally of the housing; an elongated arm pivotally carried by the support plate, said arm swinging in a plane adjacent one side of the housing; a saw blade projecting forwardly from and swingable with the arm for cutting through said limb responsive to swinging of the arm in opposite directions, adjustment of said follower longitudinally of the housing being adapted for shifting the blade longitudinally of the housing to selected positions relative to said hooks, means adapted to be controlled remotely from the housing for swinging the arm; and means connected to the screw extending downwardly from the housing for rotating the screw from a location remote from the housing, comprising an elongated pole and a bracket connected to the housing for adjustment to selected angular positions relative to the housing, said pole being journaled in the bracket for adjustment therewith in respect to the housing, said pole having a universal connection to the screw for rotating the screw in each position to which the pole is angularly adjusted in respect to the housing, said bracket and housing having interlocking means engaging in each position to which the bracket is adjusted, for maintaining the bracket in the selected position of adjustment, the saw blade being pivoted upon said arm for swingable movement about an axis paralleling the pivot axis of the arm, said saw blade being resiliently, yieldably biased about its connection to the arm in a downward direction, so as to shift the saw blade downwardly into engagement with the limb being cut during swingable movement of said arm.

7. A tree limb cutting device comprising an elongated housing; hook means carried by the housing for suspending the same from a limb to be cut; a screw rotatable in and extending longitudinally of the housing; a follower threadedly engaged with the screw and held against rotation by the housing, for shifting of the follower longitudinally of the housing responsive to rotation of the screw; a support plate rigid with the follower for movement therewith longitudinally of the housing; an elongated arm pivotally carried by the support plate, said arm swinging in a plane adjacent one side of the housing; a saw blade projecting forwardly from and swingable with the arm for cutting through said limb responsive to swinging of the arm in opposite direction, adjustment of said follower longitudinally of the housing being adapted for shifting the blade longitudinally of the housing to selected positions relative to said hooks, means adapted to be controlled remotely from the housing for swinging the arm; and means connected to the screw extending downwardly from the housing for rotating the screw from a location remote from the housing, comprising an elongated pole and a bracket connected to the housing for adjustment to selected angular positions relative to the housing, said pole being journaled in the bracket for adjustment therewith in respect to the housing, said pole having a universal connection to the screw for rotating the screw in each position to which the pole is angularly adjusted in respect to the housing, said bracket and housing having interlocking means engaging in each position to which the bracket is adjusted, for maintaining the bracket in the selected position of adjustment, the saw blade being pivoted upon said arm for swingable movement about an axis paralleling the pivot axis of the arm, said saw blade being resiliently, yieldably biased about its connection to the arm in a downward direction, so as to shift the saw blade downwardly into engagement with the limb being cut during swingable movement of said arm, the saw blade being longitudinally curved substantially concentrically with the pivot axis of the arm.

References Cited in the file of this patent

FOREIGN PATENTS 680,109     France _____ Jan. 17, 1930